(12) United States Patent  
Pedrazzoli

(10) Patent No.: US 7,978,179 B2  
(45) Date of Patent: Jul. 12, 2011

(54) SYSTEM AND METHOD FOR CONFIGURING A COMPUTER KEYBOARD

(75) Inventor: Fernando Daniel Pedrazzoli, Madrid (ES)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 11/944,627

(22) Filed: Nov. 25, 2007

(65) Prior Publication Data

US 2008/0136783 A1 Jun. 12, 2008

(30) Foreign Application Priority Data

Dec. 6, 2006 (EP) ..................................... 06125478

(51) Int. Cl.  
G06F 3/02 (2006.01)

(52) U.S. Cl. ........................................ 345/172; 341/22

(58) Field of Classification Search .................. 345/172; 341/22

See application file for complete search history.

(56) References Cited

U.S. PATENT DOCUMENTS

| | | | |
|---|---|---|---|
| 4,647,911 A | 3/1987 | Maegawa et al. | |
| 4,668,020 A | 5/1987 | Barr | |
| 5,164,723 A | 11/1992 | Nebenzahl | |
| 5,797,098 A * | 8/1998 | Schroeder et al. | 455/464 |
| 7,250,898 B2 * | 7/2007 | Higginson | 341/176 |
| 7,256,714 B2 * | 8/2007 | Philipp | 341/33 |
| 7,466,859 B2 * | 12/2008 | Chang et al. | 382/181 |
| 7,554,529 B2 * | 6/2009 | Kotipalli | 345/168 |
| 2002/0084919 A1 | 7/2002 | Green | |
| 2003/0011574 A1 * | 1/2003 | Goodman | 345/172 |
| 2004/0117331 A1 | 6/2004 | Lutnick et al. | |
| 2004/0218963 A1 | 11/2004 | Van Diepen et al. | |
| 2005/0122313 A1 | 6/2005 | Ashby | |
| 2005/0141752 A1 | 6/2005 | Bjorgan et al. | |
| 2007/0182595 A1 * | 8/2007 | Ghasabian | 341/22 |
| 2007/0279255 A1 * | 12/2007 | Danish | 341/22 |
| 2009/0109067 A1 * | 4/2009 | Burstrom | 341/22 |

OTHER PUBLICATIONS

"Skippy Word Prediciton Software," http://www.tni.be/products/word-prediction-start.php, Dec. 27, 2007.  
"AutoHotkey—Automation, Hotkeys, Scripting," http://www.autohotkey.com, Sep. 25, 2009.  
"Hot Keyboard macro utility for Windows," http://www.hot-keyboard.com/hkpro.htm, Jan. 17, 2008.  
"American Systems EZ Macros," http://www.americansys.com/ezmacros.htm, 2008.  
"Simply the Best Software Macro Recorders," http://simplythebest.net/shareware/utilities/macro_recorders.html, 2010.

* cited by examiner

*Primary Examiner* — Richard Hjerpe  
*Assistant Examiner* — Jeffrey Parker  
(74) *Attorney, Agent, or Firm* — Anthony V S England; William Steinberg

(57) ABSTRACT

A computer keyboard is set up a with full-scale programmable hotkeys for users. The user easily defines words/word sequences he/she frequently uses for word processing. By depressing a dedicated key, the corresponding predefined word/word sequence is immediately displayed to the user.

19 Claims, 4 Drawing Sheets

SYSTEM AND METHOD FOR CONFIGURING A COMPUTER KEYBOARD

CROSS-REFERENCE TO RELATED APPLICATION

The present invention contains matter entitled to the benefit of the priority date of, and with regard to that matter hereby claims the benefit of the priority date of, application 06125478.5, which was filed in the European Patent Office on Dec. 6, 2006.

TECHNICAL FIELD

The present invention relates to the field of computer keyboards and more particularly to a configuring and using key codes on a computer keyboard.

BACKGROUND

Whereas a lot of devices such as pointing devices, a game controllers or sensors may be used to interact with a computer, a keyboard still remains the main interface for a user to enter a text using a word processor. In the word processing domain, the typing speed up combined with the word syntax checking opens a reliability concern. Several solutions exist to assist a user and improve the efficiency of the typing. One of them is the word prediction.

Generally, the predictive analysis solutions propose a word or a list of words to the user after having identified the leading letter(s) of the desired word. The identification of the first typed letters initiates a recognition mechanism that allow to complete the rest of the word by the algorithm of the prediction software. The user then has to confirm the proposed word by striking a specific key or any command made available for this action or disregard it. This may lead to the necessity of reinitiating the process when the predictive word is not the one as expected. In such case, the user must cancel the proposed word and re-launch the process. Such recovery is a limitation to a speed up improvement. For example, for a word like "incompetent" the user has to type nearly all the letters till a differentiation occurs with the close word "incompetence".

In addition, long expressions and/or group of words like "according to our discussion" or "I am pleased to submit our offer" are not yet supported by the existing predictive analysis solutions.

Based on the same prediction concept, another method presents a predefined list of words from which the user has to select the one he wants. Once again, this learning approach on which a word library is displayed to the user to select the appropriate word considerably slows down the typing performance expected.

Other solutions to speed up typing are based on the generation of predefined commands in order to execute system tasks but those are generally reserved to invoke menu command or to execute program on the system not to display frequently used expressions.

Several solutions describe configurable keyboards to help inexperienced users improve their keyboard flexibility. However, these systems are not suitable to speed up the word processing typing.

Finally, advanced solutions based on macro utilities allow a user to vary key stroke assignment by changing key ordering and obtaining upgradeable hotkey sequence configurations. This flexibility allows the user to enable or disable the hotkey sequence with regard to a given application. Although the macro utilities exercising seems not to be too complicated for a skilled person, it is not adapted to an inexperienced user having to set up specific macros for his/her day-to-day environment.

In addition, the generation of a new hotkey sequences can conflict with other ones that are already included in the system. In this case the user must be aware of the existing hotkey sequences of the application he/she runs to avoid such conflict.

This effect may also appear when external users create macros to be shared between several users, like sharing spreadsheets for example. This issue is easily detectable by the skilled user who is able to initiate the corrective action, but could be a critical issue very complex or impossible to recover for the inexperienced user.

Finally, all the aforementioned methods present several drawbacks, some of which are the following:

The typing speed up combined with the word syntax checking reliability lead to limitations when using the word predictive method.

Typing with aggressive performance constraints renders prediction laborious when identifying words which contain lots of similar characters.

Confirmation of the predicted word by using command available or specific key for this action generates an additional user operation.

Prediction of the word that is not the one as expected initiates additional user interactions to cancel and to restart the process.

Storing a predefined expression is not included in the predictive technology.

The solution that presents a list of words based on the learning approach on which a word library is displayed to select the appropriate word considerably slows down the typing performance.

Existing solutions to execute software applications are reserved for the operating system.

Exercising the macro utilities from the configuration to the application is too complex for non-skilled people.

Therefore, the lack of flexibility in the systems configuration has created a need for a solution to improve both the user typing speed performance and for an easy mechanism of hotkey setting and generation.

The present invention offers a solution to solve the aforementioned problems.

SUMMARY OF THE INVENTION

The present invention is directed to setting up programmable hotkeys and use of those hotkeys by users. The user uses a computer's keyboard to load predefined word sequences he/she frequently uses. Responsive to the user depressing a dedicated key the computer immediately displays a corresponding, predefined word sequence to the user.

Accordingly, a first object of the invention is to provide a solution for having most frequently used words or group of words rapidly displayed while minimizing key stroke operations. This allows inexperienced people to easily practice any key stroke operation.

A second object is to provide a solution to quickly accomplish repetitive word processing tasks that an individual performs frequently. This feature further provides necessary assistance to people having functional impairments, particularly in visual or in dexterity. In addition, this feature minimizes writing effort and saves time when word processing is initiated.

A third object is to provide a solution based on a programmable approach instead of a predictive one.

Another object of the invention is to provide a solution where the user is offered the possibility to define the key coding at any stage within a typing time period, which may include either during the keyboard initialization or in real time during the edition.

Yet another object of the invention is to provide a solution that is fully compliant with any standardized keyboard (QVERTY or AZERTY) and their associated software interfaces.

Thus, in a preferred embodiment, a method for a configured computer keyboard is provided and comprises the steps of:
- detecting a key stroke on at least one of a plurality of keys of the computer keyboard;
- generating a key qualifier from the key stroke detection;
- comparing the key qualifier with a list of existing key qualifiers; and
- based on the result of the comparing step:
  - initiating a word acquisition process allowing a user to define a word sequence to be associated to the key stroke detection; or
  - initiating a word restitution process to retrieve the word sequence associated with the key stroke detection.

Further embodiments are defined in the dependent claims. According to the invention, there is also provided a computer program product and a system for performing the above described methods and other methods described herein below.

BRIEF DESCRIPTION OF THE DRAWINGS

The above and other items, features and advantages of the invention will be better understood by reading the following more particular description of the invention in conjunction with the accompanying drawings wherein.

DETAILED DESCRIPTION OF THE INVENTION

Figure 1:
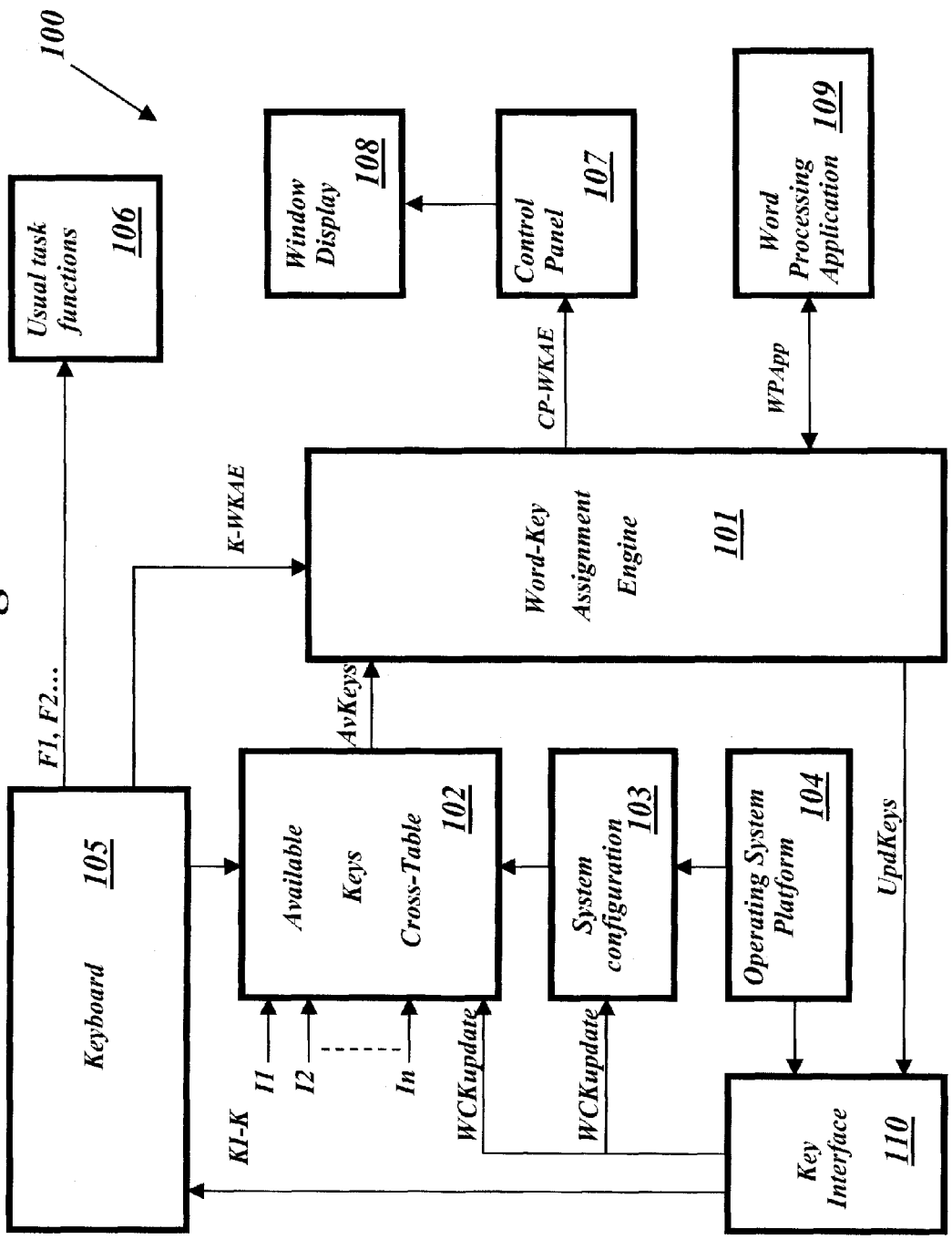
FIG. 1 shows a functional block diagram of an embodiment of the present invention.

Referring first to FIG. 1, a functional block diagram 100 of the system of the present invention is shown. The system comprises a Word-Key Assignment Engine—WKAE—(101) to which are coupled a plurality of functional blocks:
- Block 102, herein named Available Keys Cross-Table—AKCT—that contains a cross-table of the keys (named AvKeys) available for configuration of the keyboard, that is, a map of spare keys like unsupported keystrokes as well as dead keys that are reserved for implementing the present invention.
- Block 103, herein named System Configuration;
- Block 104, herein named Operating System Platform;—
- Keyboard 105;
- Block 106, herein named Usual Task functions;
- Block 107, herein named Control Panel;
- Window display 108;
- Block 109 that represents an application such as a Word Processing application or a Spreadsheet application; and
- Block 110, herein named Key Interface.

One advantage of the present invention is its full compliance to the conventions supported by most applications designed for the well-known Operating Systems such as AIX, Windows, Mac, Linux or others OS. To achieve this compliance, the Keyboard (105) is functionally coupled to the Operating System Platforms block (104) to handle the various Operating Systems. An exemplary list of the potential applications that may be operated by the present invention are referenced from inputs 'I1' up to 'In' in FIG. 1 and may comprise: Windows XP, Mac OS, Frontpage 2003, Internet Explorer, Mozilla Firefox, Netscape, Office 2006 suite, Lotus suite, and so on.

The Usual Task Functions block (106) manages special character keys other than the alphabetic or numeric ones, also named "dead keys or spare keys", function keys (F1, F2, . . . ) or combination or sequence of keystrokes (e.g., "Ctrl+Alt+Supp").

In operation, the plurality of keys available for the personalization (the AvKeys) are issued from the Available Keys Cross-Table block—AKCT—(102), and applied to the Word-Key Assignment Engine block—WKAE—(101).

Thus, the Word-Key Assignment Engine block (101) receives:
- the map of the available keys from the Available Keys Cross-Table (102) at a first input L1; and
- the key qualifiers (K-WKAE) from the Keyboard (105) at a second input L2.

And, the Word-Key Assignment Engine block (101) transmits:
- the process related information (CP-WKAE) to the Control Panel block (107) from a first output L3;
- the decoded word or expression (WPApp) to the Application block (109) from a second output L4; and
- the current mapping key situation (UpdKeys) to the Key Interface block (110) from a third output L5. The transmission of the current mapping allow to reconfigure in real-time the System Configuration block and the Available Keys Cross-Table block.

When a user depresses a key on the Keyboard, an internal signal representing a key qualifier is generated and transmitted to the Engine block to run the Word-Key assignment process. The Word-Key Assignment Engine process associates the depressed key to a unique word or expression to be reproduced by the Application block. For each (Key,Word) pair created, the Cross-table of the AKCT block is updated via the Key Interface block (110) to reflect in real-time the whole key configuration. To achieve the update operation, the keys status 'UpdKeys' is sent to the Key Interface block which then output data signals to the Keyboard block (KI-K connection), to the System Configuration block and to the Available Keys Cross-Table block (WCKupdate connection).

The activity status of the Work-Key Assignment Engine block (101) is reported to the Control Panel block (CP-WKAE connection) and may be displayed on request to the user computer display by using bar controls or another means of visualization like a popup Window Display (108). In addition, various assignments job information can be displayed, like the expression nickname or the exact word expression associated to the dedicated key.

Figure 2:
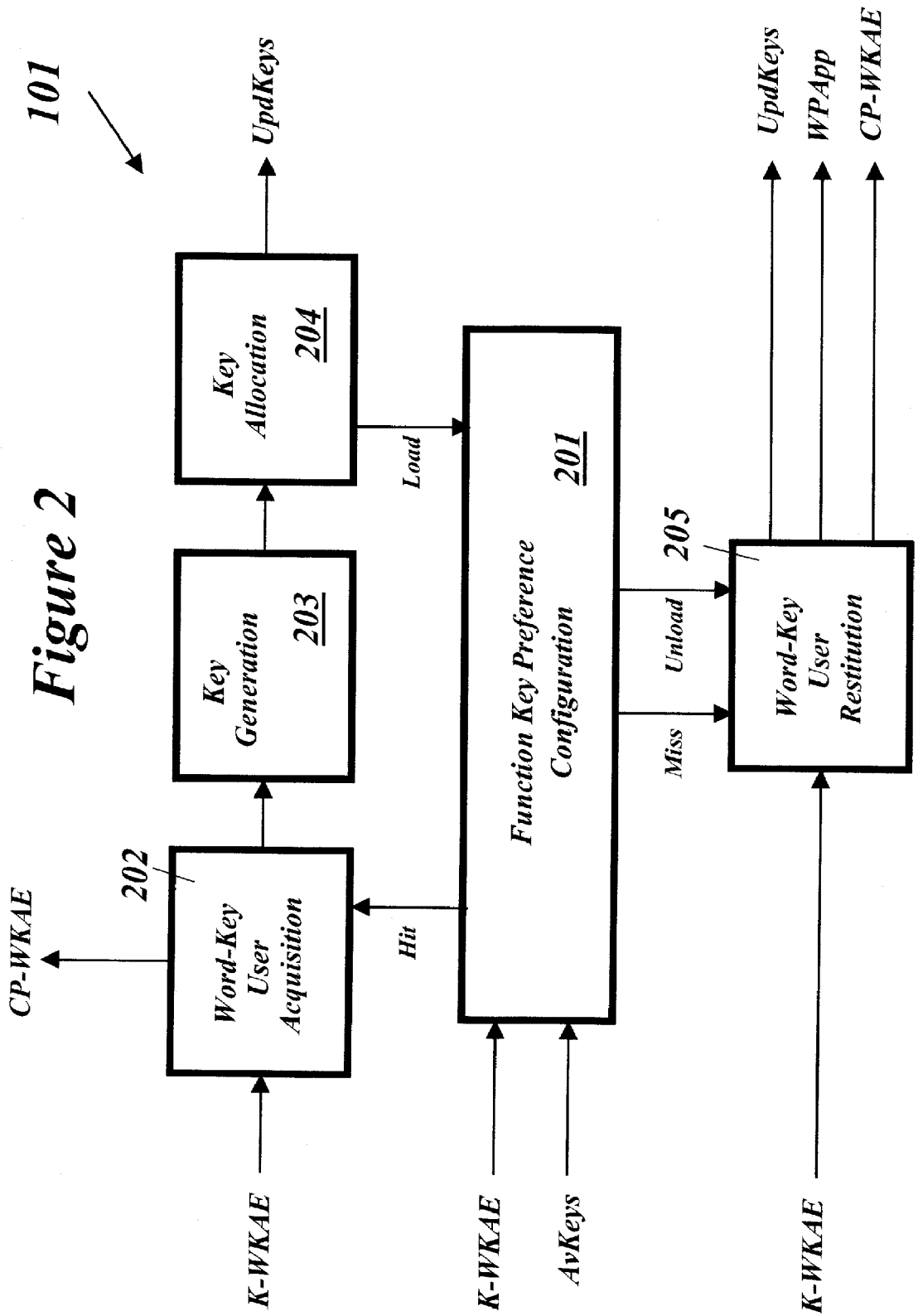
FIG. 2 is a detailed view of the Word-Key Assignment Engine block of FIG. 1, according to an embodiment of the present invention.

FIG. 2 illustrates a detailed view of the Word-Key Assignment Engine block 101 of FIG. 1. A Function Key Preference Configuration block 'FKPC' (201) receives the key qualifiers 'K-WKAE' from the keyboard. As it will be detailed with reference to FIG. 3, the key qualifiers are compared to the list of the available keys 'AvKeys' within block 201 to operate either an acquisition process within Acquisition block (202) or a restitution process within Restitution block (205).

The Key qualifiers are also applied to a Word-Key User Acquisition block 'WKUA' (202) and to a Word-Key User Restitution block 'WKUR' (205).

The Word-Key User Acquisition block (202) is coupled to a Key Generation block (203) and to the Control Panel block (107 of FIG. 1).

The Key Generation block (203) is coupled to the Key Allocation block (204) which delivers to the Key Interface block (110 of FIG. 1) the updated keys UpdKeys.

The Key Allocation block is coupled to the Function Key Preference Configuration block (201).

The Word-Key User Restitution block (205) is coupled to block 201, and delivers the specified word (or expression) WPApp to the Application block (109 of FIG. 1). Furthermore, block 205 also delivers the respective signals (UpdKeys,CP-WKAE) to update the Key Interface block and the Control Panel block.

The present invention offers the user at least two possibilities to allocate the specified keystrokes. Either the current keyboard layout is kept as by default to generate the pairs of (Key,Word). Alternatively, new symbol keys may be defined. That is, conventional keyboards include keys, such as function keys <F1>, <F2>, etc., for invoking tasks that depend on what software application is active and how the active application is configured. They also include other keys, such as <Ctrl>, <Alt>, etc., for changing the function of predetermined keys when pressed in combination with the predetermined keys. (For example, in a word processing application the <Enter> key may insert a carriage return in a document, whereas the <Enter><Ctrl> key combination may insert a page break.) According to this alternative embodiment of the present invention, a keyboard is provided that includes one or more new keys for word configuring, the "WC" key or keys (or simply "WCK"). The 'WCK' generation process described herein allows the user to combine new keys with existing ones already available on the keyboard.

A desired word or expression that the user wants to apply to the Applications may be assigned to one WCK key. However, any combination of multiple keystrokes may be defined by simply depressing several keys simultaneously or in sequence. The multiple allocation commodities provide the user with more key combinations.

Figure 3:
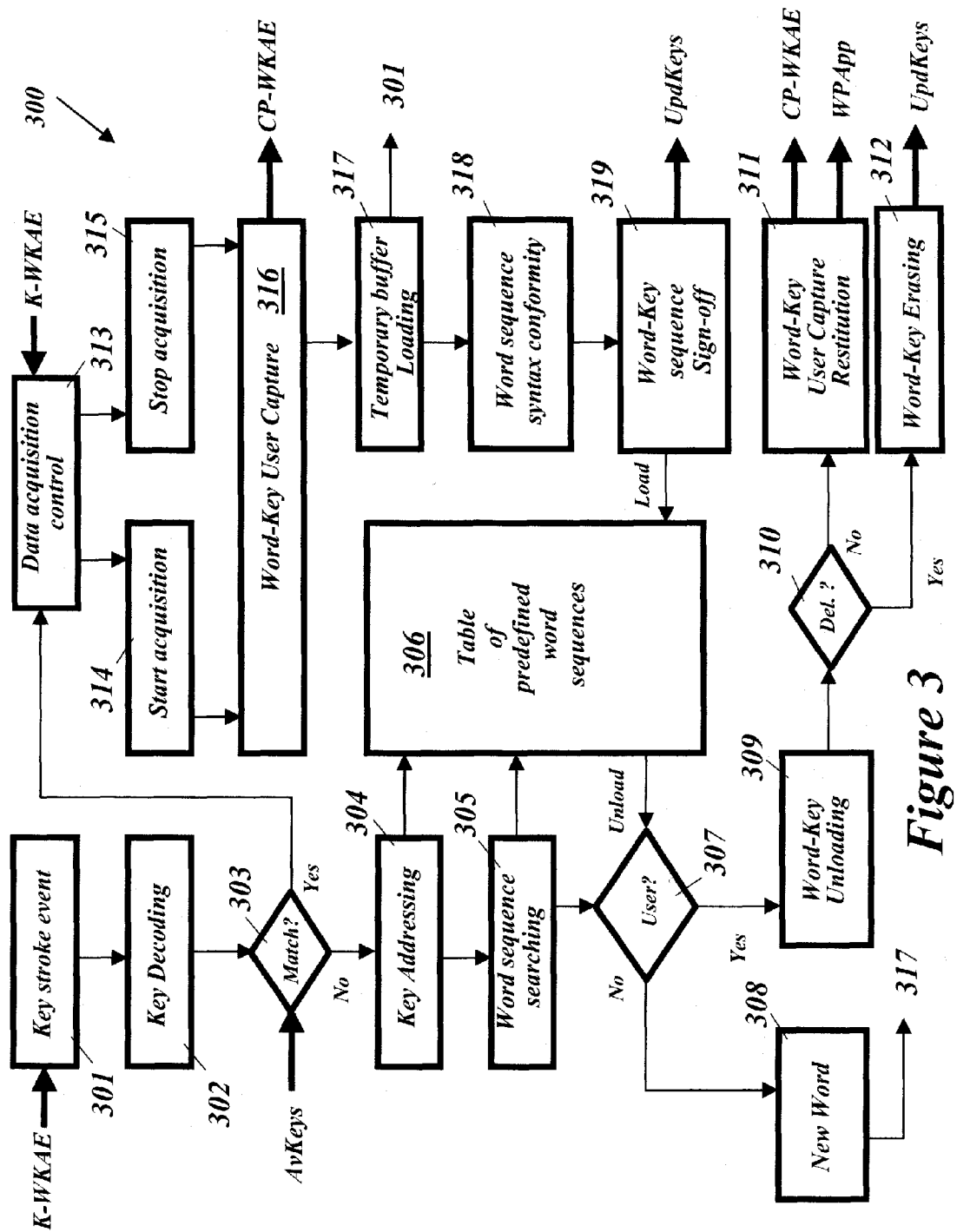
FIG. 3 is a flow chart of a Word-Key Assignment process, according to an embodiment of the present invention.

The algorithmic details of the process run at the Word-Key Assignment Engine are now described with reference to FIG. 3 along with numeral references to FIGS. 1 and 2. The Word-Key Assignment Engine processes the operations that determine which key is either already associated to a word or to an expression or is to be defined.

It is to be considered that the Available Key Cross-Table delivers the list of the keys available to be assigned by the Word-Key Assignment Engine block as potential programmable keys. These keys are initialized to their default values depending both on the Operating System Platform and the System Configuration. As already mentioned, the default values are the "unused keys" or the "dead keys" values. The Function Key Preference Configuration (201) determines which of a Word-Key User Acquisition process or of the Word-Key User Restitution process is initiated to start the Assignment process as now described.

On a first step 301, a key stroke event is detected.

Next, on step 302, the corresponding key qualifiers are decoded and then compared to the list of the available keys on step 303.

If the comparison hits (branch Yes) which means that the decoded key qualifier matches one of the available keys, then the process goes to step 313, otherwise (branch No) the process goes to step 304.

On step 313, the keyboard information K-WKAE coming from the Keyboard block is sampled to start the Word-Key User Acquisition Capture process which will safely assign the depressed key while avoiding keyboard configuration conflict. Simultaneously, step 313 initiates a Start acquisition phase (step 314) and a Stop acquisition phase (step 315) of the Word-Key User Capture process (316). The time duration of the Start and the Stop acquisition steps depend on the length of the word sequence that needs to be recorded. During the capture step 316 the signals CP-WKAE are also delivered to the Control Panel block.

Next on step 317, the current word sequence is stored into a temporary buffer to allow multiple word key acquisition processes to be successively performed.

Then, on step 318, the syntax conformity of the current word sequence may be checked in a usual manner in terms of any special characters or misspelling or word incoherence.

Once checked the conformity, the word (or word expression) is signed-off on step 319, and the UpdKeys signals are delivered to update the Key Interface block. Simultaneously, the current pair of (Key,Word) is written into the Table of the predefined word sequences (306). The Table of predefined word sequence is preferably a Dynamic Random Access Memory.

Later, on a user request, the pair of (Key,Word) is restored via the Word-Key User Capture Restitution (step 311) as explained now.

Going back to step 303, if the comparison of available keys and detected key qualifier indicates a mismatch (branch "No"), meaning that the depressed key has already been assigned by the system, the process proceeds with step 304.

The mechanism related to the Word-Key User Restitution process is represented by steps (304, 305, 307, 308, 309, 310, 311 and 312), which relates to addressing and loading/unloading operations at the Table of the predefined word sequences (306), as follows:

On step 304, the Table of the Predefined word sequences is addressed and simultaneously the process proceeds with step 305.

On step 305, the word sequences that were already loaded during previous acquisition phases are searched, and the word sequence assigned to the current key qualifier is unloaded from the storage table 306.

Next, on step 307, the user is prompted to either accept the existing word or to modify it.

In case of rejection (branch "No"), the process allows on step 308 the user to enter in real time a new word (or expression) to be assigned to the key depressed. The process goes to step 317 to have the new word loaded into Table memory.

In case of acceptance (branch "Yes"), the process goes to step 309 where the existing word is extracted from the table of predefined word sequences.

On next step 310, the process may allow the user to eventually delete the current association (Key,Word). The corresponding association is refreshed (step 312) and could be reallocated at a next word-key acquisition process. Furthermore, the current mapping key configuration is also refreshed and the corresponding message (UpdKeys) is sent to the Key Interface block (110 of FIG. 1) in order to reconfigure both the system and the Available Keys Cross-Table block (102 of FIG. 2), in real-time.

Back on step 310, if the user keeps the current pair (Key, Word), then the Word-Key User Capture Restitution process is enabled on step 311 to deliver the predefined word expression to the application block (WPApp). In addition, the Control Panel block is updated (CP-WKAE).

The present invention, aspects of which are shown in the above described figures, may be distributed in the form of instructions, which may include data structures and may be referred to as a "computer program," "program," "program code," "software," "computer software," "resident software," "firmware," "microcode," etc. Stored on a computer-readable storage medium, such instructions and storage medium may be referred to as a "computer program product," "program product," etc.

The computer program product may be accessible from a computer-readable storage medium providing program code for use by or in connection with a computer or any instruction execution system. The present invention applies equally regardless of the particular type of media actually used to carry out the distribution. The instructions are read from the computer-readable storage medium by an electronic, magnetic, optical, electromagnetic or infrared signal. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The instructions may also be distributed by digital and analog communications links, referred to as "transmission media."

A data processing system suitable for storing and/or executing program code includes at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

Input/output ("I/O") devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
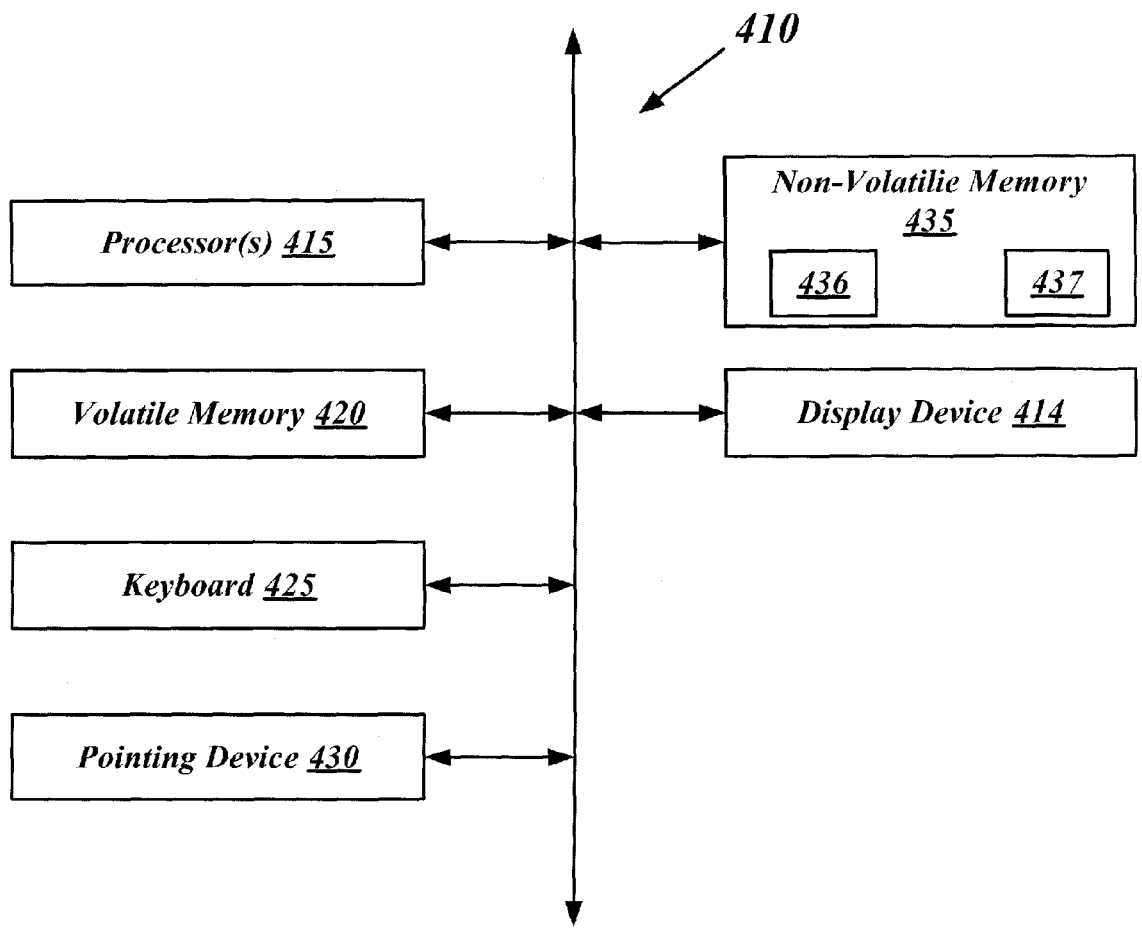
FIG. 4 illustrates a computer system that includes instructions for performing methods described herein, according to an embodiment of the present invention.

Referring now to FIG. 4, a computer system 410 is illustrated, which may take a variety of forms, including a personal computer system, mainframe computer system, workstation, server, etc. That is, it should be understood that the term "computer system" is intended to encompass any device having a processor that executes instructions from a memory medium. In the illustrated system embodiment, system 410 includes one or more processors 415, a keyboard 425, a pointing device 430, and tangible, computer-readable storage media, including volatile 420, and nonvolatile memory 435, e.g., ROM, hard disk, floppy disk, CD-ROM, and DVD, and display device 414.

Memory 435 of system 410 stores computer programs 436 (also known as "software programs"), wherein programs 436 include instructions that are executable by one or more processors 415 to implement various embodiments of a method in accordance with the present invention. That is, programs 436 include instructions for implementing the processes of the above described figures. Memory 435 of system 410 may also have data 437 stored thereon that provides parameters, etc. for programs 436. It should be understood that the combination of programs 436 and computer readable memory, such as memory 435, is one embodiment of a computer program product, and that such a computer program product may also include data 437.

Those of ordinary skill in the art will appreciate that the hardware in FIG. 4 may vary depending on the implementation. For example, other peripheral devices may be used in addition to or in place of the hardware depicted in FIG. 4. The depicted example is not meant to imply architectural limitations with respect to the present invention. Various embodiments of system 410 implement one or more software programs 436 and data 437 in various ways, including procedure-based techniques, component-based techniques, and/or object-oriented techniques, among others. Specific examples include XML, C, C++ objects, Java and commercial class libraries.

Unless clearly and explicitly stated, the claims that follow are not intended to imply any particular sequence of actions. The inclusion of labels, such as a), b), c) etc., for portions of the claims does not, by itself, imply any particular sequence, but rather is merely to facilitate reference to the portions.

It has to be appreciated that while the invention has been particularly shown and described with reference to a preferred embodiment, various changes in form and detail may be made therein without departing from the spirit, and scope of the invention.

What is claimed is:

1. A method for a computer keyboard, comprising the steps of:

generating a key qualifier signal for a user selected key on a keyboard responsive to a user depressing the user selected key;

transmitting the key qualifier signal to a word-key pair assignment process;

receiving the key qualifier by a function key preference configuration subprocess of the word-key pair assignment process comparing, by the function key preference configuration subprocess, the received key qualifier and keys available for assigning;

selecting between sending a hit signal and sending a miss signal by the function key preference configuration subprocess responsive to the comparing, wherein the hit signal initiates steps in an acquisition process and the miss signal initiates steps in a restitution process, wherein the steps in the acquisition process include:

assigning the user selected key to a unique word or expression entered by the user, thereby creating a key-word pair, wherein the assigning includes:

sending an update key status signal to a key interface process by the word-key pair assignment process responsive to the key qualifier signal; and outputting data signals responsive to the update key status signal by the key interface process, including data signals indicating to update a first stored list of available keys and a second stored list of user defined words or expressions;

and wherein the steps in the restitution process include:

prompting the user to select between i) accepting a word or expression in the second list that is currently assigned to the user selected key and ii) modifying the currently assigned word or expression; and updating the second list responsive to the user selecting to modify the currently assigned word or expression.

2. The method of claim 1, further comprising the step of:
  displaying, by a control panel process, a nickname for the word or expression assigned to the user selected key.
3. The method of claim 1, further comprising the step of:
  capturing the word or expression entered by the user during a time frame capture, wherein the capturing includes initiating a start acquisition phase and a stop acquisition phase and time interval between the starting and the stopping depends on length of the word or expression to be entered by the user.
4. The method of claim 1, further comprising the step of:
  checking syntax of the word sequence entered by the user to detect nonpermitted characters, misspelling and word incoherence.
5. The method of claim 1, further comprising the step of:
  storing the word or expression entered by the user into a temporary buffer to allow multiple word key acquisition processes to be successively performed.
6. The method of claim 1, further comprising the step of:
  allocating more than one word or expression entered by the user to the same user selected key by combining the user selected key with another user selected key.
7. A computer program product, stored on a computer readable medium, for use with a computer keyboard, the computer program product having instructions for execution by a computer, wherein the instructions, when executed by the computer, cause the computer to implement a method comprising the steps of:
  generating a key qualifier signal for a user selected key on a keyboard responsive to a user depressing the user selected key;
  transmitting the key qualifier signal to a word-key pair assignment process;
  receiving the key qualifier by a function key preference configuration subprocess of the word-key pair assignment process
  comparing, by the function key preference configuration subprocess, the received key qualifier and keys available for assigning;
  selecting between sending a hit signal and sending a miss signal by the function key preference configuration subprocess responsive to the comparing, wherein the hit signal initiates steps in an acquisition process and the miss signal initiates steps in a restitution process, wherein the steps in the acquisition process include:
  assigning the user selected key to a unique word or expression entered by the user, thereby creating a key-word pair, wherein the assigning includes:
  sending an update key status signal to a key interface process by the word-key pair assignment process responsive to the key qualifier signal; and
  outputting data signals responsive to the update key status signal by the key interface process, including data signals indicating to update a first stored list of available keys and a second stored list of user defined words or expressions;
and wherein the steps in the restitution process include:
  prompting the user to select between i) accepting a word or expression in the second list that is currently assigned to the user selected key and ii) modifying the currently assigned word or expression; and
  updating the second list responsive to the user selecting to modify the currently assigned word or expression.
8. The computer program product of claim 7, wherein the method implemented by the computer executing the instructions of the computer program product further comprises:
  displaying, by a control panel process, a nickname for the word or expression assigned to the user selected key.
9. The computer program product of claim 7, wherein the method implemented by the computer executing the instructions of the computer program product further comprises:
  capturing the word or expression entered by the user during a time frame capture, wherein the capturing includes initiating a start acquisition phase and a stop acquisition phase and time interval between the starting and the stopping depends on length of the word or expression to be entered by the user.
10. The computer program product of claim 7, wherein the method implemented by the computer executing the instructions of the computer program product further comprises:
  checking syntax of the word sequence entered by the user to detect nonpermitted characters, misspelling and word incoherence.
11. The computer program product of claim 7, wherein the method implemented by the computer executing the instructions of the computer program product further comprises:
  storing the word or expression entered by the user into a temporary buffer to allow multiple word key acquisition processes to be successively performed.
12. The computer program product of claim 7, wherein the method implemented by the computer executing the instructions of the computer program product further comprises:
  allocating more than one word or expression entered by the user to the same user selected key by combining the user selected key with another user selected key.
13. A computer system comprising:
  a processor; and
  a storage device connected to the processor, wherein the storage device has stored thereon a keyboard-user program for controlling the processor, and wherein the processor is operative with the program to execute the program for performing the steps of:
  generating a key qualifier signal for a user selected key on a keyboard responsive to a user depressing the user selected key;
  transmitting the key qualifier signal to a word-key pair assignment process;
  receiving the key qualifier by a function key preference configuration subprocess of the word-key pair assignment process
  comparing, by the function key preference configuration subprocess, the received key qualifier and keys available for assigning;
  selecting between sending a hit signal and sending a miss signal by the function key preference configuration subprocess responsive to the comparing, wherein the hit signal initiates steps in an acquisition process and the miss signal initiates steps in a restitution process, wherein the steps in the acquisition process include:
  assigning the user selected key to a unique word or expression entered by the user, thereby creating a key-word pair, wherein the assigning includes:
  sending an update key status signal to a key interface process by the word-key pair assignment process responsive to the key qualifier signal; and
  outputting data signals responsive to the update key status signal by the key interface process, including data signals indicating to update a first stored list of available keys and a second stored list of user defined words or expressions;
and wherein the steps in the restitution process include:
  prompting the user to select between i) accepting a word or expression in the second list that is currently assigned to the user selected key and ii) modifying the currently assigned word or expression; and updating the second list responsive to the user selecting to modify the currently assigned word or expression.

14. The computer system of claim 13, wherein the method implemented by the computer executing the instructions of the program comprises:

displaying, by a control panel process, a nickname for the word or expression assigned to the user selected key.

15. The computer system of claim 13, wherein the method implemented by the computer executing the instructions of the program comprises:

capturing the word or expression entered by the user during a time frame capture, wherein the capturing includes initiating a start acquisition phase and a stop acquisition phase and time interval between the starting and the stopping depends on length of the word or expression to be entered by the user.

16. The computer system of claim 13, wherein the method implemented by the computer executing the instructions of the program comprises:

checking syntax of the word sequence entered by the user to detect nonpermitted characters, misspelling and word incoherence.

17. The computer system of claim 13, wherein the method implemented by the computer executing the instructions of the program comprises:

storing the word or expression entered by the user into a temporary buffer to allow multiple word key acquisition processes to be successively performed.

18. The computer system of claim 13, wherein the method implemented by the computer executing the instructions of the program comprises:

allocating more than one word or expression entered by the user to the same user selected key by combining the user selected key with another user selected key.

19. The computer system of claim 13, wherein the user selected key on the keyboard is a key dedicated to word configuring.

* * * * *